(12) United States Patent
Li et al.

(10) Patent No.: US 9,911,954 B2
(45) Date of Patent: Mar. 6, 2018

(54) ANTI-EXPLOSION PACKAGE OF SOFT-PACKED SECONDARY BATTERY

(71) Applicant: CONTEMPORARY AMPEREX TECHNOLOGY CO., LIMITED, Ningde (CN)

(72) Inventors: Fang Li, Ningde (CN); Huan Gao, Ningde (CN); Wei Wang, Ningde (CN); Dongyan Zhao, Ningde (CN)

(73) Assignee: Contemporary Amperex Technology Co., Limited, Ningde, Fujian Province (CN)

( * ) Notice: Subject to any disclaimer, the term of this patent is extended or adjusted under 35 U.S.C. 154(b) by 30 days.

(21) Appl. No.: 15/257,503

(22) Filed: Sep. 6, 2016

(65) Prior Publication Data
US 2017/0256765 A1    Sep. 7, 2017

(30) Foreign Application Priority Data

Mar. 2, 2016 (CN) .................. 2016 2 0157111 U

(51) Int. Cl.
*H01M 2/12* (2006.01)
*H01M 10/0525* (2010.01)
*H01M 2/02* (2006.01)

(52) U.S. Cl.
CPC .......... *H01M 2/1241* (2013.01); *H01M 2/021* (2013.01); *H01M 2/0212* (2013.01);
(Continued)

(58) Field of Classification Search
CPC ............ H01M 2/1241; H01M 2/0275; H01M 2/0217; H01M 2/0212; H01M 10/0525; H01M 2/021; H01M 2200/20
See application file for complete search history.

(56) References Cited

U.S. PATENT DOCUMENTS

| 4,842,965 A * | 6/1989 | Urushiwara ........ H01M 2/1241 |
| | | 220/203.08 |
| 2008/0233468 A1* | 9/2008 | Otohata ................. H01G 2/08 |
| | | 429/53 |

(Continued)

FOREIGN PATENT DOCUMENTS

| JP | H1055792 | 2/1998 |
| JP | 2000100399 A | 4/2000 |

(Continued)

OTHER PUBLICATIONS

First Office Action for Japanese Application No. 2016-136766 dated Jul. 25, 2017, with machine English translation provided by foreign associate.

(Continued)

*Primary Examiner* — Stewart A Fraser
(74) *Attorney, Agent, or Firm* — Ladas & Parry, LLP

(57) ABSTRACT

An anti-explosion package of soft-packed secondary battery, including: upper film, lower film, packaging area and anti-explosion area, an outer edge of upper film and lower film are sealed to form hollow cavity for accommodating naked battery core; packaging area is provided on at least one outer edge of upper film and lower film, anti-explosion area is arranged in packaging area, packaging areas of upper film and lower film are adhered together except location of anti-explosion area, so that upper film and lower film are sealed at this side, anti-explosion area includes opening area and transition area successively arranged in a direction from an edge of packaging area close to hollow cavity to an edge away from hollow cavity; portion of the upper film and lower film at opening area is not adhered, portion located at transition area is adhered with intensity less than transition area.

11 Claims, 3 Drawing Sheets

(52) U.S. Cl.
CPC ....... *H01M 2/0217* (2013.01); *H01M 2/0275* (2013.01); *H01M 10/0525* (2013.01); *H01M 2200/20* (2013.01)

(56) References Cited

U.S. PATENT DOCUMENTS

| | | | |
|---|---|---|---|
| 2011/0104527 A1 | 5/2011 | Choi et al. | |
| 2011/0212350 A1* | 9/2011 | Sato | H01M 2/0404 |
| | | | 429/56 |
| 2012/0040214 A1* | 2/2012 | Kim | H01M 2/1241 |
| | | | 429/56 |
| 2014/0199581 A1* | 7/2014 | Ryu | H01M 10/0413 |
| | | | 429/161 |

FOREIGN PATENT DOCUMENTS

| | | | |
|---|---|---|---|
| JP | 2005222872 A | 8/2005 | |
| JP | 2009187889 A | 8/2009 | |
| JP | 2011507183 A | 3/2011 | |
| KR | 20140055641 A | 5/2014 | |
| KR | 20120060314 A | 6/2017 | |

OTHER PUBLICATIONS

Extended European Search Report and Opinion for European Patent application No. 16179345 dated Aug. 17, 2017.

* cited by examiner

ANTI-EXPLOSION PACKAGE OF SOFT-PACKED SECONDARY BATTERY

CROSS-REFERENCE TO RELATED APPLICATION

This application claims the benefit of and priority to Chinese Patent Application 201620157111.8 filed on Mar. 2, 2016, which is hereby incorporated in its entirety herein by reference.

TECHNICAL FIELD

The present application relates to the field of Li-ion battery manufacturing technologies and, in particular, to an anti-explosion package of a soft-packed secondary battery.

BACKGROUND

With development of new energy technologies, Li-ion battery has been widely used in people's daily life, particularly, soft-packed Li-ion battery has been applied to various fields in recent years.

Generally, the battery core of the soft-packed Li-ion battery will generate large amount of heat due to overheating, overcharging, internal short, collision, pressure and so on. However, if the large amount of heat cannot be dissipated in time, the battery may burn or even explode, which is harmful to peoples' life and their property.

Anti-explosion package of existing soft-packed batteries generally has a packaging gap formed in the packaging area, so that heat generated by the battery core can be dissipated through the packaging gap. Since the intensity of packaging at the packaging gap is the same as areas other than the packaging gap, it cannot be guaranteed that the breakage occurs at the packaging area of the gap.

In addition, in a normal situation, the electrolyte will corrode the outer package, when the gap (i.e., the unpackaged area) is large, the packaging area is narrow accordingly, under such situation, battery leakage may occur due to the poor leakproofness.

SUMMARY

The present application provides an anti-explosion package of a soft-packed secondary battery, which can prevent battery explosion effectively, at the same time, can guarantee breakage occurring at packaging area of the gap.

The present application provides an anti-explosion package of a soft-packed secondary battery, including: an upper film, a lower film, a packaging area and an anti-explosion area, an outer edge of the upper film and an outer edge of the lower film are sealed and connected with each other, so as to form a hollow cavity for accommodating a naked battery core; a packaging area with a certain width is provided on at least one outer edge of the upper film and the lower film, the anti-explosion area is arranged in the packaging area, all the packaging areas of the upper film and the lower film are adhered together except the location of the anti-explosion area, so that the upper film and the lower film are sealed at this side. The anti-explosion area includes an opening area and a transition area, the opening area and the transition area are arranged successively in a direction from an edge of the packaging area close to the hollow cavity to an edge away from the hollow cavity; the portion of the upper film and the lower film located at the opening area is not adhered, the portion of the upper film and the lower film located at the transition area is adhered with an intensity less than that of the transition area.

Preferably, the upper film and the lower film are formed by folding an integral structure in half, except the outer edge formed by folding, the other outer edges are all provided with the packaging areas;

or all the outer edges of the upper film and the lower film are provided with the packaging areas.

Preferably, the opening area includes an opening connected with the hollow cavity, a first bottom edge connected with the transition area and two first side walls connecting the opening and two ends of the first bottom edge; the length of the first bottom edge is less than that of the opening.

Preferably, the two first side walls are both curved surfaces or bevels.

Preferably, the two first side walls are arranged symmetrically.

Preferably, the transition area includes a top edge connected with the opening area, a second bottom edge away from the opening area and two second side walls connecting the top edge with two ends of the second bottom edge. The length of the second bottom edge is less than that of the top edge.

Preferably, the first bottom edge overlaps with the top edge, an extending direction of the second side wall is same as that of the first side wall.

Preferably, there are multiple anti-explosion areas, which are arranged in the packaging area, respectively.

Preferably, the anti-explosion area is located at the middle of the packaging area.

Preferably, the length of the anti-explosion area is $\frac{1}{5}$-$\frac{1}{10}$ of the length of the packaging area;

and/or the size of the transition area in the direction from a side away from the opening area pointing to the opening are is 1-2 times of the size of the opening area in the same direction.

The technical solution provided by the present application can achieve the following beneficial effect:

The anti-explosion package of the soft-packed secondary battery provided by the present application, through arranging the anti-explosion area including an opening area and a transition area at the packaging area, on one hand, can generate a weak area on the packaging area, so that the heat generated by the battery core can be ejected from the weak area of the anti-explosion area through the guidance of the opening area and the transition area with low intensity, so as to prevent battery explosion effectively.

On the other hand, since the existence of the transition area, leakage caused by the poor leakproofness can be prevented.

It is should be understood that the above general description and the following detailed description are just exemplarily, which do not limit the present application.

DESCRIPTION OF EMBODIMENTS

Figure 1:
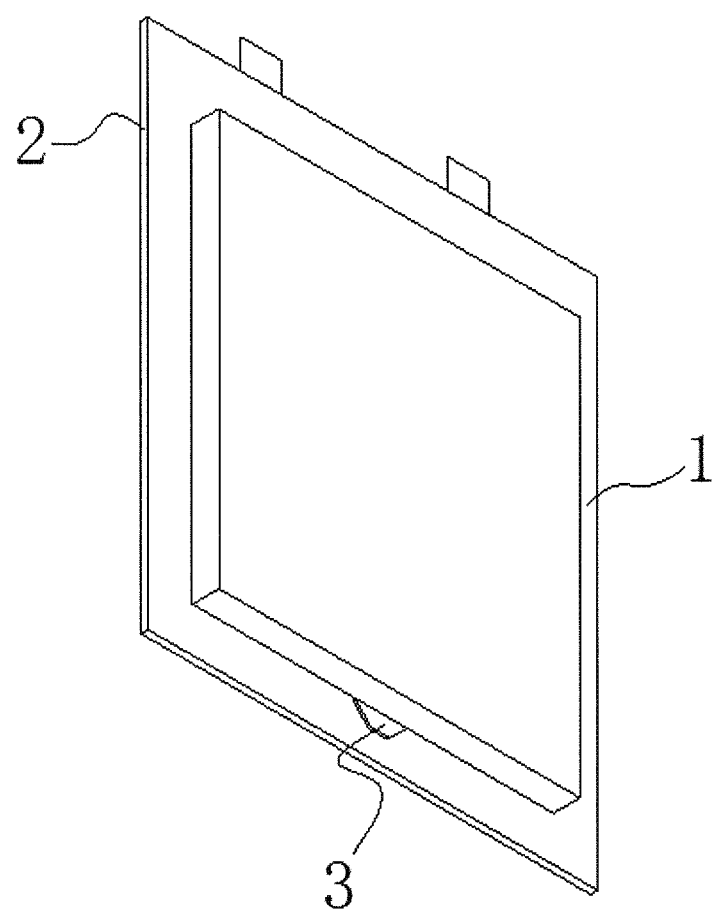
FIG. 1 is an integral structural schematic diagram of an anti-explosion package of a soft-packed secondary battery provided by an embodiment of the present application, in which the anti-explosion area is an inverted trapezoid.

The present application will be described in further detail through specific embodiments and the accompany drawings. The "front", "back", "left", "right", "up", "down" are referring to the placing state of the anti-explosion package of the soft-packed secondary battery in the drawings.

Figure 2:
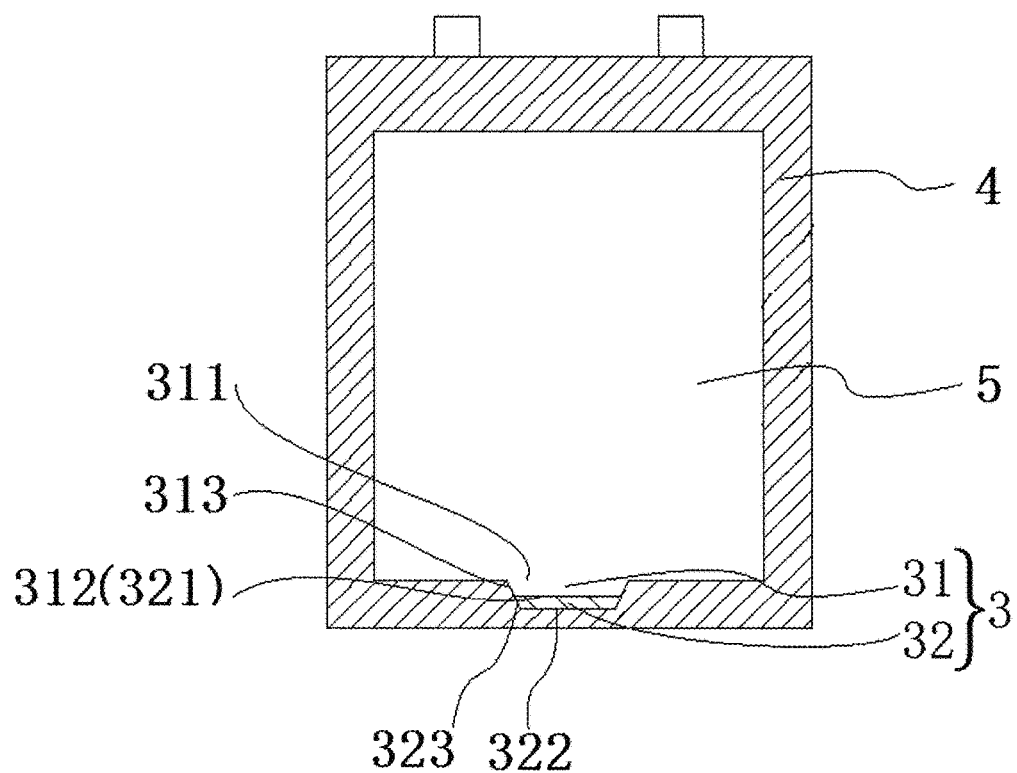
FIG. 2 is a sectional view of FIG. 1.

As shown in FIG. 1 and FIG. 2, the present application provides an anti-explosion package of a soft-packed secondary battery, including:

An upper film 1, a lower film 2, a packaging area 4 and an anti-explosion area 3, an outer edge of the upper film 1 is connected with an outer edge of the lower film 2, the connecting manner can be adhesive connection, thus forming a hollow cavity 5 for accommodating a naked battery core; a packaging area 4 with a certain width is provided on at least one outer edge of the upper film 1 and the lower film 2, in FIG. 2, all outer edges of the upper film and the lower film are provided with packaging areas 4. The anti-explosion area 3 is arranged in the packaging area 4, the packaging areas 4 of the upper film 1 and the lower film 2 are all adhered together except the location of the anti-explosion area; the anti-explosion area 3 includes an opening area 31 and a transition area 32, the opening area 31 and the transition area 32 are arranged successively in a direction from an edge of the packaging area 4 close to the hollow cavity 5 to an edge away from the hollow cavity 5; the portion of the upper film 1 and the lower film 2 located at the opening area 31 is not adhered, the portion of the upper film 1 and the lower film 2 located at the transition area 32 is adhered with an intensity less than that of the packaging area 4.

It should be noted that: in other embodiments of the present application, the upper film 1 and the lower film 2 in the embodiment shown in FIG. 1 and FIG. 2 can be arranged as a whole at one outer edge, to form an integral packaging film, the other outer edges of the upper film 1 and the lower film 2 are adhered mutually. A packaging area 4 with a certain width is provided at the mutually adhered outer edges of the packaging film, that is, folding the integral packaging film in half to form the upper film 1 and the lower film 2, except the outer edge formed by folding, the other outer edges are all provided with the packaging areas 4. Thus, the packaging areas 4 of the packaging film are all adhered together except the location of the anti-explosion area 3, which forms the hollow cavity 5 for accommodating the naked battery core.

Due to the existence of the anti-explosion area 3, the packaging area 4 will generate a weak area at the location of the anti-explosion area 3. When the battery core of the soft-packed Li-ion battery generates a large amount of heat due to overheating, overcharging, internal short, collision, pressure and so on, at this time, the pressure inside the anti-explosion package increases gradually, when the pressure reaches the pressure limitation of the anti-explosion area 3 of the anti-explosion package of the soft-packed secondary battery, gas and electrolyte can arrive at the weak area of the packaging area 4 through the guidance of the opening area 31 and the transition area 32, since the width of the weak area is narrower than the other ares of the packaging area 4, the overall intensity is relatively small, therefore is easy to be broken through by the internal gas with high-pressure and high-temperature, the gas and the electrolyte are ejected from the broken weak area, so as to prevent the continuous increasing of the pressure inside the battery effectively, and prevent the battery from exploding because of the high internal pressure, thereby guaranteeing peoples' life and their property.

Since the anti-explosion area 3 includes the opening area 31 and the transition area 32 with relative small intensity, when the pressure inside the anti-explosion package increases, the pressure will be gathered at the transition area 32 with relative small intensity first, break through the transition area 32, and then break through the packaging area 4. However, since the traditional anti-explosion package is not provided with a transition area 32 with relative small intensity, therefore, the high-temperature and high-pressure gas cannot be gathered at the opening 31 and break through the packaging area 4.

In addition, since the transition area 32 is arranged, the sealing effect of the opening area 31 can be strengthened, so as to prevent electrolyte leakage of the battery because of the corrosion effect of the electrolyte.

In the embodiment shown in FIG. 1 and FIG. 2, the opening area 31 includes an opening 311 connected with the hollow cavity 5, a first bottom edge 312 connected with the transition area 32 and two first side walls 313 connecting the opening 311 and two ends of the first bottom edge 312; the length of the first bottom edge 312 is less than that of the opening 311. The two first side walls 313 are both bevels, which are arranged symmetrically.

In this way, the pressure due to the heat generated by the battery core can be gathered at the first bottom edge 312 rapidly, so as to break through the first bottom edge 312 rapidly.

Of course, the two first side walls 313 also can be arranged as curved surfaces, in this way, the pressure inside the anti-explosion package can be gathered at the first bottom edge 312 rapidly, and then break through the first bottom edge 312 rapidly.

In the embodiment shown in FIG. 1 and FIG. 2, the transition area 32 includes a top edge 321 connected with the opening area 31, a second bottom edge 322 away from the opening area 31 and two second side walls 323 connecting the top edge 321 with two ends of a second bottom edge 322; the length of the second bottom edge 322 is less than that of the top edge 321. The first bottom edge 312 and the top edge 321 are overlapped, the extending direction of the second side wall 323 is in accordance with that of the first side wall 313.

In this way, the bottom edge of the anti-explosion area 3 can be broken through by the inner high-pressure and high-temperature gas and electrolyte effectively, so as to let the pressure be distributed uniformly and along a single direction, therefore, the weak area can be broke through totally.

In other embodiments of the present application, there can be multiple anti-explosion areas 3, which are arranged in the packaging area 4 separately.

In this way, when the pressure in the anti-explosion package is large, multiple anti-explosion areas 3 can be arranged, the pressure in the anti-explosion package will break through the multiple anti-explosion areas 3, and the gas and the electrolyte are ejected from the broken anti-explosion area 3. Therefore, multiple anti-explosion areas 3 can facilitate discharging of the gas and electrolyte in the anti-explosion package rapidly.

Preferably, the anti-explosion area 3 is provided at the middle of the packaging area 4 located at the outer edge thereof. The energy of the battery core is easy to be released from the middle portion. The length of the anti-explosion area 3 is 1/5-1/10 of the length of the packaging area 4 located thereof. Arranging like this is because when the anti-explosion area 3 is so large that the leakproofness is poor, which is easy to cause battery leakage; when the anti-explosion area 3 is so small that the weak area cannot be broken through easily by the heat in the battery core, the anti-explosion performance is poor. The size of the transition area 32 in the direction from the side away from the opening area 31 pointing to the opening area 31 (i.e. the size from the top edge 321 of the transition 32 to the second bottom edge 322) is 1-2 times of the size of the opening area 31 in the same direction. When the width of the transition area 32 is so large that the weak area of the packaging area 4 cannot be broken through easily by the heat in the battery core, the anti-explosion performance is poor. When the width of the transition area 32 is so small that the leakproofness is poor, which is easy to cause leakage.

Figure 3:
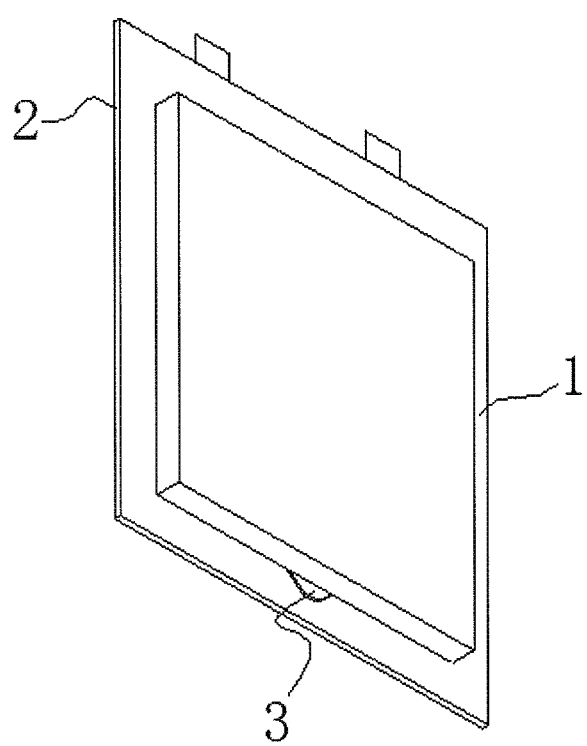
FIG. 3 is an integral structural schematic diagram of the anti-explosion package of the soft-packed secondary battery provided by the embodiments of the present application, in which the anti-explosion area is an inverted circular arc;
1—upper film
2—lower film
3—anti-explosion area
31—opening area
311—opening
  312—first bottom edge
  313—first side wall
32—transition area
  321—top edge
  322—second bottom edge
  323—second side wall
4—packaging area
5—hollow cavity The drawings are incorporated into the specification and constitute as a part of the specification, showing embodiments of the present application, and are used to explain the theory of the present application together with the specification.

The shape of the anti-explosion area 3 prefers to be inverse trapezoid (refer to FIG. 1 and FIG. 2), inverse triangle, inverse circular arc (refer to FIG. 3), in this way, the gas is easy to crush into the anti-explosion area 3.

The anti-explosion package of the soft-packed secondary battery according to the present application, on one hand, can prevent the battery explosion effectively, on the other hand, can prevent battery leakage caused by poor leakproofness.

The above are just the preferred embodiments of the present application, which do not limit the present application, for those skilled in the art, the present application can have various modifications and variations. Any modifications, equivalent replacements and improvements made within the spirit and principle of the present application shall fall into the protect scope of the present application.

What is claimed is:

1. An anti-explosion package of a soft-packed secondary battery, characterized in that, comprising an upper film, a lower film, a packaging area and an anti-explosion area,
   an outer edge of the upper film and an outer edge of the lower film are sealed and connected with each other, so as to form a hollow cavity for accommodating a naked battery core;
   wherein, a packaging area with a certain width is provided on at least one outer edge of the upper film and the lower film, the anti-explosion area is arranged in the packaging area, all the packaging areas of the upper film and the lower film are adhered together except the location of the anti-explosion area, so that the upper film and the lower film are sealed at this side,
   the anti-explosion area comprises an opening area and a transition area,
   the opening area and the transition area are arranged successively in a direction from an edge of the packaging area close to the hollow cavity to an edge away from the hollow cavity;
   a portion of the upper film and the lower film located at the opening area is not adhered, a portion of the upper film and the lower film located at the transition area is adhered with an intensity less than that of the packaging area.

2. The anti-explosion package of the soft-packed secondary battery according to claim 1, characterized in that:
   the upper film and the lower film are formed by folding an integral structure in half, except the outer edge formed by folding, the other outer edges are all provided with the packaging areas;
   or
   all the outer edges of the upper film and the lower film are provided with the packaging areas.

3. The anti-explosion package of the soft-packed secondary battery according to claim 1, characterized in that:
   the opening area comprises an opening connected with the hollow cavity, a first bottom edge connected with the transition area and two first side walls connecting the opening area and two ends of the first bottom edge;
   the length of the first bottom edge is less than that of the opening.

4. The anti-explosion package of the soft-packed secondary battery according to claim 3, characterized in that:
   the two first side walls are both curved surfaces or bevels.

5. The anti-explosion package of the soft-packed secondary battery according to claim 4, characterized in that:
   the two first side walls are arranged symmetrically.

6. The anti-explosion package of the soft-packed secondary battery according to claim 3, characterized in that:
   the transition area comprises a top edge connected with the opening area, a second bottom edge away from the opening area and two second side walls connecting the top edge with two ends of the second bottom edge,
   the length of the second bottom edge is less than that of the top edge.

7. The anti-explosion package of the soft-packed secondary battery according to claim 6, characterized in that: the first bottom edge overlaps with the top edge, an extending direction of the second side wall is same as that of the first side wall.

8. The anti-explosion package of the soft-packed secondary battery according to claim 1, characterized in that:
   there are multiple anti-explosion areas, which are arranged in the packaging area, respectively.

9. The anti-explosion package of the soft-packed secondary battery according to claim 1, characterized in that:
   the anti-explosion area is located at the middle of the packaging area.

10. The anti-explosion package of the soft-packed secondary battery according to claim 1, characterized in that:
    the length of the anti-explosion area is 1/5-1/10 of the length of the packaging area.

11. The anti-explosion package of the soft-packed secondary battery according to claim 1, characterized in that:
    the size of the transition area in the direction from a side away from the opening area pointing to the opening area is 1-2 times of the size of the opening area in the same direction.

* * * * *